(12) United States Patent
Seong et al.

(10) Patent No.: US 10,325,347 B2
(45) Date of Patent: Jun. 18, 2019

(54) IMAGE PROCESSING METHOD AND APPARATUS

(71) Applicant: SAMSUNG ELECTRONICS CO., LTD., Suwon-si, Gyeonggi-do (KR)

(72) Inventors: Han-soo Seong, Yongin-si (KR); Young-jin Kwon, Yongin-si (KR); Ki-mo Kim, Hwaseong-si (KR); Young-woong Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/715,453

(22) Filed: Sep. 26, 2017

(65) Prior Publication Data
US 2018/0108112 A1  Apr. 19, 2018

(30) Foreign Application Priority Data

Oct. 18, 2016 (KR) .................. 10-2016-0135258

(51) Int. Cl.
*G06T 3/40* (2006.01)
*G06T 7/00* (2017.01)
(Continued)

(52) U.S. Cl.
CPC ............... *G06T 3/40* (2013.01); *G06T 7/001* (2013.01); *G06K 9/6215* (2013.01); *G06T 1/20* (2013.01);
(Continued)

(58) Field of Classification Search
CPC ......... G06T 3/40; G06T 3/4007; G06T 7/001; G06T 7/0006; G06T 7/60; G06T 1/20;
(Continued)

(56) References Cited

U.S. PATENT DOCUMENTS 6,307,566 B1  10/2001  Hill et al.
6,396,492 B1   5/2002  Frisken et al.
(Continued)

FOREIGN PATENT DOCUMENTS

JP  2001-052196  2/2001
JP  2006-521626  9/2006

OTHER PUBLICATIONS

Nystrom et al."Synthesising Objects and Scenes Using the Reverse Distance Transformation in 2D and 3D", p. 441-446, Image analysis and processing : 8th International Conference, ICIAP '95, San Remo, Italy, Sep. 13-15, 1995 : proceedings (3-540-60298-4, 978-3-540-60298-9.*

(Continued)

*Primary Examiner* — Saptarshi Mazumder
(74) *Attorney, Agent, or Firm* — Nixon & Vanderhye P.C.

(57) ABSTRACT

An image processing method is provided, including obtaining an input image, generating a distance field image including distance values by calculating each of the distance values respectively corresponding to pixels of the obtained input image, and enlarging the input image using the generated distance field image, wherein the generating of the distance field image includes, with respect to each pixel of the input image, determining each pixel as a center pixel and determining pixels at a constant distance away from the center pixel as reference pixels, calculating a shortest distance from among distances between the center pixel and reference pixels indicating an edge among the reference pixels, and determining the calculated shortest distance as a distance value corresponding to each pixel.

13 Claims, 9 Drawing Sheets

(51) Int. Cl.
*G06K 9/62* (2006.01)
*G06T 7/60* (2017.01)
*G06T 1/20* (2006.01)

(52) U.S. Cl.
CPC .......... *G06T 3/4007* (2013.01); *G06T 7/0006* (2013.01); *G06T 7/60* (2013.01)

(58) Field of Classification Search
CPC . G06T 2207/30164; G06T 2207/10028; G06T 2207/20036; G06T 2207/10081; G06T 2207/30108; G06T 2200/04; G06K 9/6267; G06K 9/6215; G06K 9/52; G01N 21/8851; G01N 23/04; G01N 2021/8887; G01N 2223/615
See application file for complete search history.

(56) References Cited

U.S. PATENT DOCUMENTS

| | | | |
|---|---|---|---|
| 6,437,876 B1 | 8/2002 | Phang et al. | |
| 7,106,332 B2 | 9/2006 | Perry et al. | |
| 2009/0225077 A1* | 9/2009 | Sudarsky | G06T 7/60 345/423 |
| 2011/0229024 A1* | 9/2011 | El-Maraghi | H04N 5/265 382/162 |
| 2012/0020528 A1* | 1/2012 | Yamada | G06T 7/11 382/106 |
| 2016/0232653 A1* | 8/2016 | Hishida | G01N 23/04 |

OTHER PUBLICATIONS

Gustavson et al., "Anti-aliased Euclidean distance transform", Pattern Recognition Letters, 32, 2011, pp. 252-257.

* cited by examiner

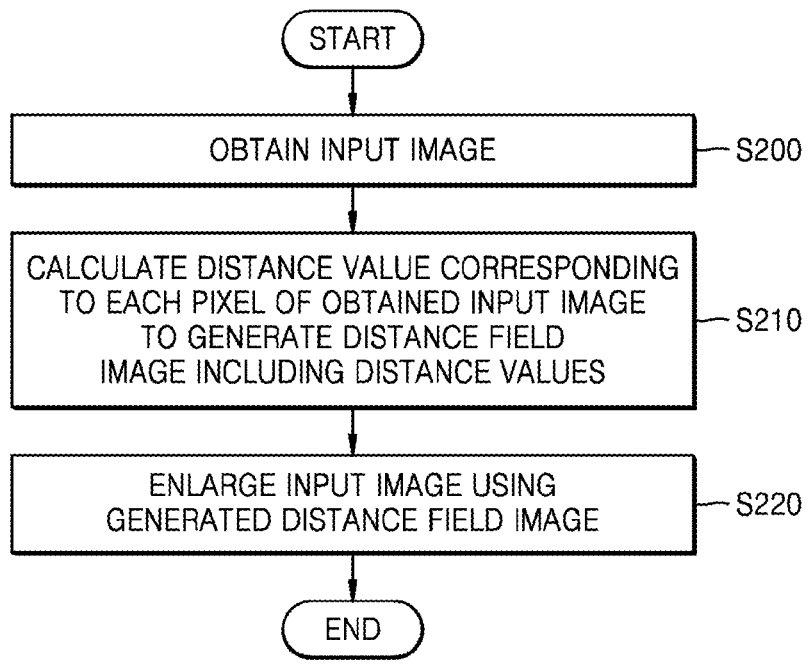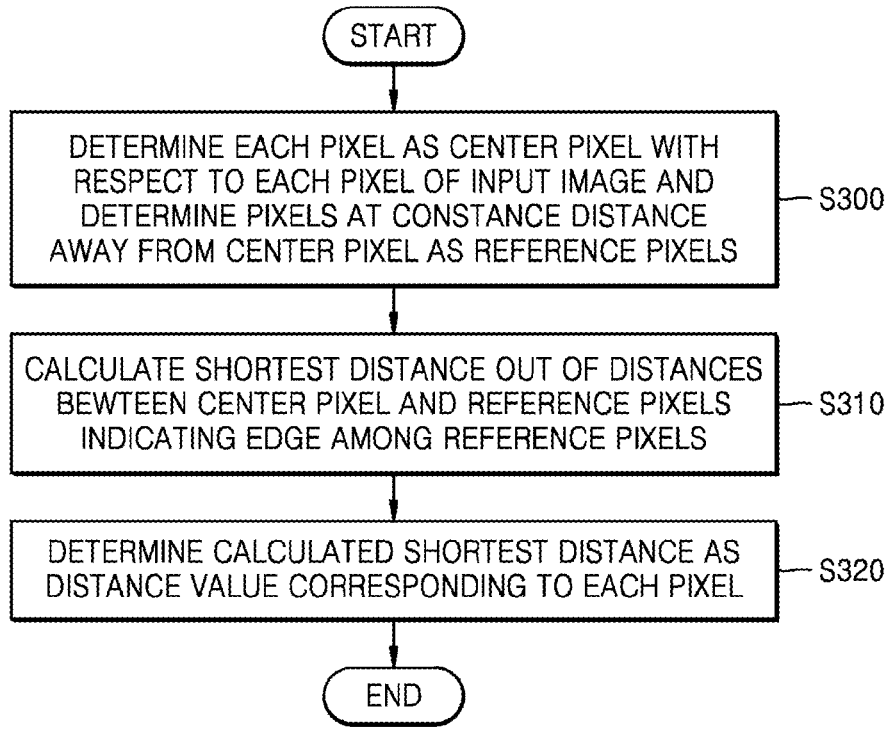

IMAGE PROCESSING METHOD AND APPARATUS

CROSS-REFERENCE TO RELATED APPLICATION

This application is based on and claims priority under 35 U.S.C. § 119 to Korean Patent Application No. 10-2016-0135258, filed on Oct. 18, 2016, in the Korean Intellectual Property Office, the disclosure of which is incorporated by reference herein in its entirety.

BACKGROUND

1. Field

The present disclosure relates generally to a method and an apparatus for processing an image, and for example, to an image processing apparatus and a method of enlarging an input image using a distance field image generated from the input image.

2. Description of Related Art

An image processing apparatus refers to a device capable of processing an image which a user may view. The image processing apparatus may present, on a display, signals transmitted from various sources to the image processing apparatus, after performing various image processing processes. Furthermore, the signals input to the image processing apparatus may have various screen ratios.

SUMMARY

An image processing apparatus and a method of generating a distance field image from an input image and enlarging the input image using the input image and the generated distance field image are provided. Additional aspects will be set forth in part in the description which follows and, in part, will be apparent from the description.

According to an aspect of an example embodiment, an image processing method includes obtaining an input image; generating a distance field image including distance values by calculating each of the distance values corresponding to each pixel of the obtained input image; and enlarging the input image using the generated distance field image, wherein the generating of the distance field image includes, with respect to each pixel of the input image, determining each pixel as a center pixel and determining pixels at a constant distance away from the center pixel as reference pixels; determining a shortest distance of distances between the center pixel and reference pixels indicating an edge among the reference pixels; and determining the determined shortest distance as a distance value corresponding to the each pixel.

According to an aspect of an example embodiment, the generating of the distance field image includes generating a reverse image of the obtained input image; generating a reverse distance field image including distance values by calculating each of the distance values corresponding to each pixel of the generated reverse image; and generating a final distance field image using the distance field image and the reverse distance field image, and the enlarging of the input image includes enlarging the input image using the final distance field image.

According to an aspect of an example embodiment, the image processing method further includes enlarging the input image using the generated distance field image and the obtained input image.

According to an aspect of an example embodiment, the enlarging of the input image includes enlarging the generated distance field image using a predetermined scaling factor; enlarging the obtained input image using the predetermined scaling factor; determining a weight to be applied to a location of each pixel thereof by applying a predetermined smoothing function to the each pixel of the enlarged distance field image; and determining a pixel value for each pixel of the enlarged input image by applying the determined weight to the each pixel.

According to an aspect of an example embodiment, the generating of the distance field image includes generating a reverse distance field image by performing a prediction using the distance values of the distance field image; and generating a final distance field image using the distance field image and the reverse distance image, and the enlarging of the input image includes enlarging the input image using the final distance field image.

According to an aspect of another example embodiment, an image processing apparatus includes a memory for storing one or more instructions; and a processor configured to process an image by executing the one or more instructions stored in the memory, wherein the processor executes the one or more instructions to: generate a distance field image including distance values by calculating each of the distance values corresponding to each pixel of the image; enlarge the input image using the generated distance field image, wherein the generating of the distance field image includes, with respect to each pixel of the input image, determining each pixel as a center pixel and determining pixels at a constant distance away from the center pixel as reference pixels; determining a shortest distance of distances between the center pixel and reference pixels indicating an edge among the reference pixels; and determining the determined shortest distance as a distance value corresponding to the each pixel.

According to an aspect of an example embodiment, when the distance field image is generated, a reverse image of the input image is generated, and a distance value corresponding to each pixel of the generated reverse image is calculated so that a reverse distance field image including distance values is generated, and a final distance field image is generated using the distance field image and the reverse distance field image, and, when the input image is enlarged, the input image is enlarged using the final distance field image.

According to an aspect of an example embodiment, the input image is enlarged using the generated distance field image and the input image.

According to an aspect of an example embodiment, when the input image is enlarged, the generated distance field image is enlarged using a predetermined scaling factor, the input image is enlarged using the predetermined scaling factor, a weight to be applied to a location of each pixel of the enlarged distance field image is determined by applying a predetermined smoothing function to the each pixel, and a pixel value for each pixel of the enlarged input image is determined by applying the determined weight to the each pixel.

According to an aspect of an example embodiment, when the distance field image is generated, a reverse distance field image is generated by performing a prediction using distance values of the distance field image, and a final distance field image is generated using the distance field image and the reverse distance image, and when the input image is enlarged, the input image is enlarged using the final distance field image.

According to an aspect of another example embodiment, a computer-readable recording medium having recorded thereon a computer program comprising program commands for performing, when executed in a device, the above operations is provided.

BRIEF DESCRIPTION OF THE DRAWINGS

These and/or other aspects, features and attendant advantages of the present disclosure will become apparent and more readily appreciated from the following detailed description, taken in conjunction with the accompanying drawings, in which like reference numerals refer to like elements, and wherein:

FIG. 2 is a flowchart illustrating an example method of enlarging an input image using the input image and a distance field image generated from the input image, according to an example embodiment;

FIGS. 3, 4A and 4B include a flowchart and diagrams illustrating an example of generating a distance field image, according to an example embodiment;

DETAILED DESCRIPTION

Figure 1:
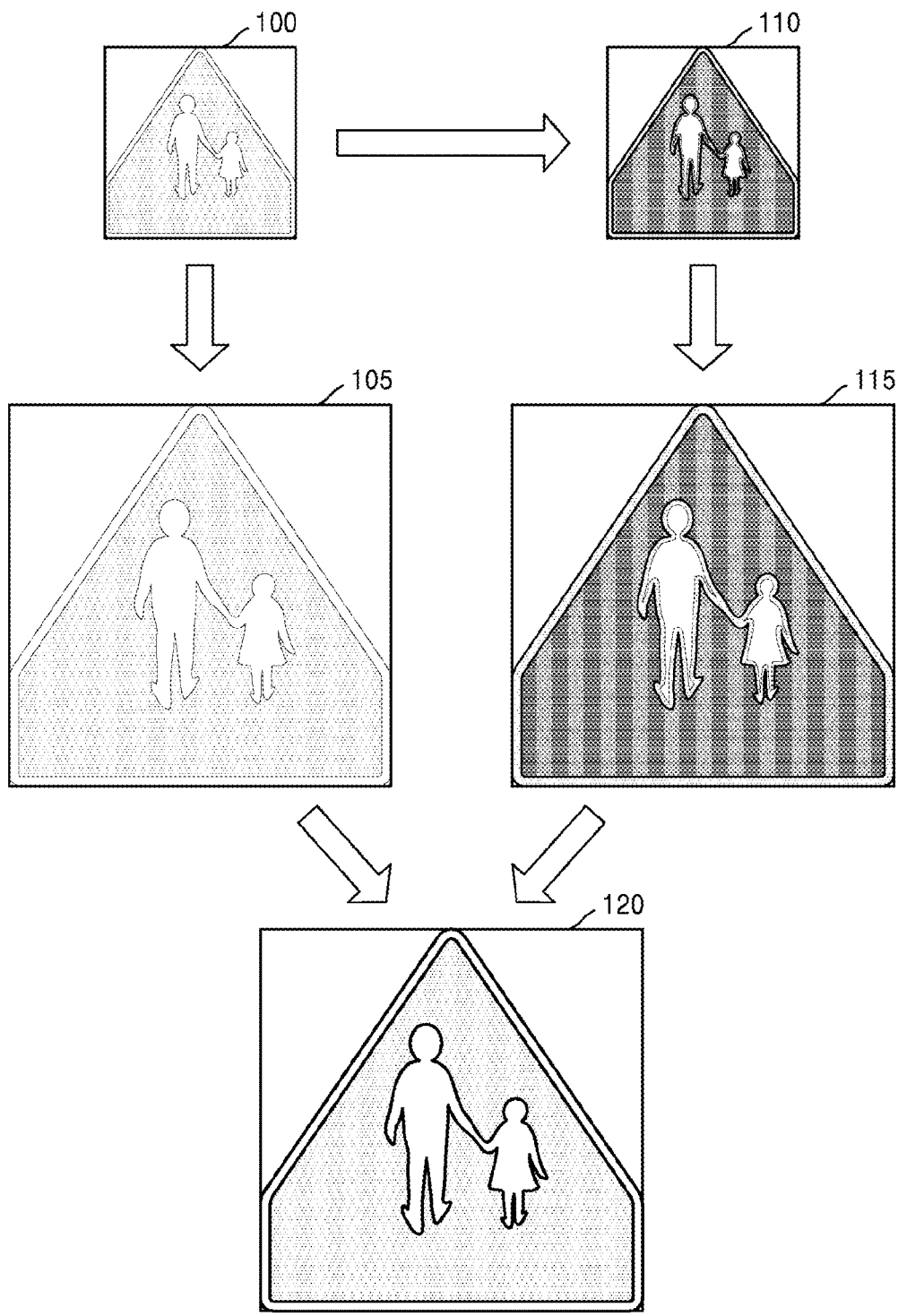
FIG. 1 is a diagram illustrating an example of enlarging an input image using the input image and a distance field image generated from the input image, according to an example embodiment.

Most of the terms used herein are general terms that have been widely used in the technical art to which the present disclosure pertains. However, some of the terms used herein may be created reflecting intentions of technicians in this art, precedents, or new technologies. Accordingly, the specific terms used herein should be understood based on the unique meanings thereof and the whole context of the present disclosure.

While such terms as "first," "second," etc., may be used to describe various components, such components must not be limited to the above terms. The above terms are used only to distinguish one component from another.

The terms used in the present disclosure are merely used to describe various example embodiments, and are not intended to limit the present disclosure. An expression used in the singular encompasses the expression of the plural, unless it has a clearly different meaning in the context. It will be understood that when a region is referred to as being "connected to" another region, the region can be "directly connected to" another region or "electrically connected to" another region, or intervening elements may be present. Throughout the disclosure, when a portion "includes" an element, another element may be further included, rather than excluding the existence of the other element, unless otherwise described.

The use of the terms "a" and "an" and "the" and similar referents in the context of describing the present disclosure, especially in the context of the following claims, are to be understood to cover both the singular and the plural. Also, the steps of all methods described herein can be performed in any suitable order unless otherwise indicated herein or otherwise clearly contradicted by context. The present disclosure is not limited to the described order of the steps.

Phrases such as "in an embodiment" or "in some embodiments", which appear in various places in the disclosure, are not necessarily all referring to the same embodiment.

The present disclosure may be described in terms of functional block components and various processing steps. Such functional blocks may be realized by any number of hardware and/or software components configured to perform the specified functions. For example, the functional blocks of the present disclosure may be implemented by one or more microprocessors, or may be implemented by circuit components designed for a specific function. Furthermore, for example, the functional blocks of the present disclosure may be implemented using any programming or scripting language. Functional blocks may be implemented in algorithms that are executed on one or more processors. Furthermore, the present disclosure may employ any number of conventional techniques for electronics configuration, signal processing and/or control, data processing and the like. The words "mechanism," "element," "means," and "configuration" are used broadly and are not limited to mechanical or physical embodiments.

Furthermore, the connecting lines, or connectors shown in the various figures presented are intended to represent example functional relationships and/or physical or logical couplings between the various elements. It should be noted that many alternative or additional functional relationships, physical connections or logical connections may be present in a practical device.

Hereinafter, more detailed descriptions of the present disclosure will be provided with reference to accompanying drawings.

FIG. 1 is a diagram illustrating an example of enlarging an input image using the input image and a distance field image generated from the input image, according to an example embodiment Referring to FIG. 1, an image processing apparatus may obtain an input image 100 and generate a distance field image 110 from the obtained input image 100. According to an embodiment, an image processing apparatus may include an image processing apparatus 10 of FIG. 9. Hereinafter, an image processing apparatus will be referred to as the image processing apparatus 10.

According to an embodiment, the input image 100 may include, for example, and without limitation, a grayscale image or a color image.

According to an embodiment, when the image processing apparatus 10 obtains a color image, only a Y component may be obtained from each pixel component of the obtained color image to obtain a grayscale image corresponding to the obtained color image. However, the disclosed embodiments are not limited thereto.

Also, according to an embodiment, the distance field image 110 may be obtained using the input image 100 input to an image processing apparatus. The distance field image 110 may, for example, refer to a model used when processing an edge in 3D graphics and may be referred to as an image indicating a distance between each pixel of an image and an edge or a boundary thereof.

Also, referring to FIG. 1, the image processing apparatus 10 may obtain an enlarged input image 105 by applying a predetermined scaling factor to the input image 100 and may also obtain an enlarged distance field image 115 by applying a predetermined scaling factor to the obtained distance field image 110.

According to an embodiment, an image enlarging method may include nearest-neighbor interpolation, bilinear interpolation, or bicubic interpolation, but embodiments are not limited thereto.

Also, referring to FIG. 1, the image processing apparatus 10 may obtain a final enlarged input image 120 using the enlarged input image 105 and the enlarged distance field image 115.

According to an embodiment, the final enlarged input image 120 may be an image that is clearer and has reduced aliasing near an edge or a boundary than the enlarged input image 105 obtained using a conventional image enlarging method.

For example, the image processing apparatus 10 according to an example embodiment calculates (determines) a distance value corresponding to each pixel of an input image, and thus, a distance field image including distance values may be generated and an input image may be enlarged using the generated distance field image. For example, when generating a distance field image, the image processing apparatus 10 according to an embodiment may determine each pixel as a center pixel with respect to each pixel of an input image, determine pixels at a constant distance away from the center pixel as reference pixels, calculate a shortest distance from among distances between the center pixel and reference pixels that indicate an edge, and determine the calculated shortest distance as a distance value corresponding to each pixel.

Also, the image processing apparatus 10 according to an embodiment, when generating a distance field image, may generate a reverse image of the obtained input image, calculate a distance value corresponding to each pixel of the generated reverse image to generate a reverse distance field image including distance values, generate a final distance field image using the distance field image and the reverse distance field image, and when enlarging an input image, enlarge the input image using the final distance field image.

Also, the image processing apparatus 10 according to an embodiment may enlarge an input image using a generated distance field image and an obtained input image.

Also, the image processing apparatus 10 according to an embodiment may, when enlarging an input image, enlarge a distance field image generated using a predetermined scaling factor, enlarge an input image obtained using a predetermined scaling factor, apply a predetermined smoothing function to each pixel of the enlarged distance field image to determine a weight to be applied to a location of each pixel, and determine a pixel value for each pixel based on the weight determined with respect to each pixel of the enlarged input image.

Also, the image processing apparatus 10 according to an embodiment may perform prediction using distance values of a distance field image to generate a reverse distance field image when generating a distance field image, generate a final distance field image using the distance field image and the reverse distance field image, and, when enlarging an input image, enlarge the input image using the final distance field image.

FIG. 2 is a flowchart illustrating an example method of enlarging an input image using the input image and a distance field image generated from the input image, according to an example embodiment.

In operation S200, the image processing apparatus 10 may obtain an input image. According to an embodiment, an input image may include a grayscale image or a color image, and according to an embodiment, when obtaining a color image, the image processing apparatus 10 may select only a Y component from among pixel components of the obtained color image and then obtain a grayscale image corresponding to the color image. However, the various example embodiments are not limited thereto.

In operation S210, the image processing apparatus 10 may calculate a distance value corresponding to each pixel of the obtained input image and thus, generate a distance field image including distance values. In this regard, more detailed descriptions thereof will be provided with reference to FIGS. 3 and 4.

In operation S220, the image processing apparatus 10 may enlarge an input image using the generated distance field image. According to an embodiment, the image processing apparatus 10 may enlarge an input image using the obtained input image and the generated distance field image. In this regard, more detailed descriptions thereof will be provided with reference to FIGS. 6A and 6B.

Figure 4A:
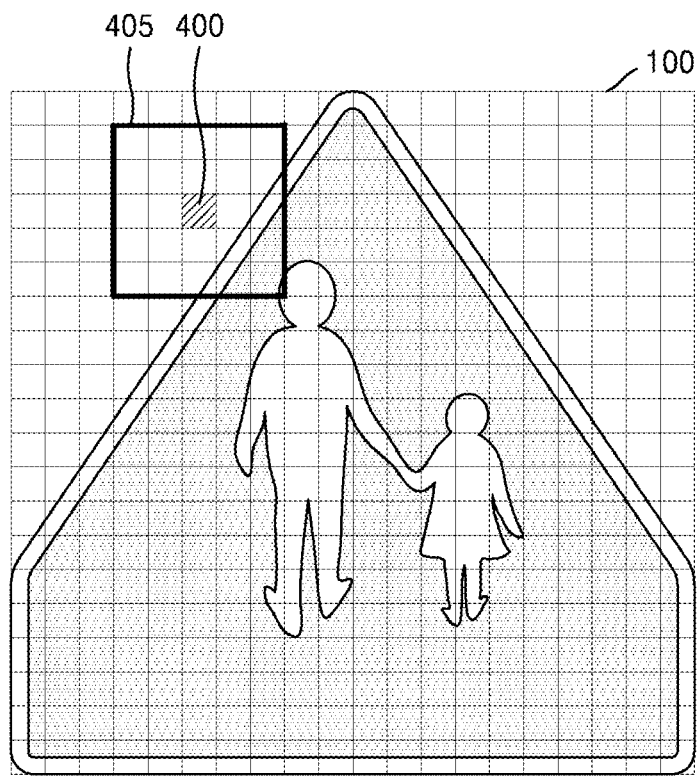
Figure 4B:
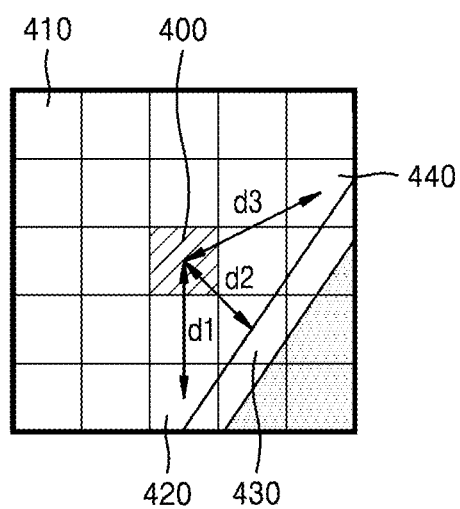

FIGS. 3, 4A and 4B are a flowchart and diagrams illustrating an example of generating a distance field image, according to an example embodiment.

In operation S300 of FIG. 3, the image processing apparatus 10 may determine each pixel as a center pixel with respect to each pixel of an input image and determine pixels at a constant distance away from the center pixel as reference pixels.

Referring to FIG. 4A, in an input image 100, an arbitrary pixel 400 is assumed to be a center pixel 400. In order to determine pixels at a constant distance away from the center pixel 400 as reference pixels, a mask 405 having a size of M×N (where M and N are arbitrary integers greater than 0) with the center pixel 400 at a center thereof may be generated. Referring to FIGS. 4A and 4B, the image processing apparatus 10 uses the mask 405 having a size of 5×5 to generate a distance field image. Also, the reference pixels may be 24 pixels except for the center pixel 400, from among pixels in the mask 405 having a size of 5×5.

In operation S310 of FIG. 3, the image processing apparatus 10 may calculate a shortest distance from among distances between the center pixel and reference pixels indicating an edge among reference pixels.

Referring to FIGS. 4A and 4B, the image processing apparatus 10 calculates a shortest distance between the center pixel 400 and reference pixels indicating an edge from among reference pixels 410 in the mask 405 having a size of 5×5. According to an embodiment, the image processing apparatus 10 may determine whether a reference pixel indicates an edge, by using a difference between a pixel value of the center pixel 400 and a pixel value of the reference pixel. FIG. 4B is an enlarged views of an area marked as a mask in FIG. 4A, and referring to FIG. 4B, there are seven pixels indicating an edge and the image processing apparatus 10 may determine a shortest distance d2 from among a distance d1 between the center pixel 400 and a reference pixel 420, a distance d2 between the center pixel 400 and a reference pixel 430, and a distance d3 between the center pixel 400 and a reference pixel 440, from among the seven pixels.

In operation S320 of FIG. 3, the image processing apparatus 10 may determine the calculated shortest distance as a distance value corresponding to each pixel.

Referring to FIG. 4B, the image processing apparatus 10 may determine a shortest distance (d2 or d3) as a distance value corresponding to the center pixel 400. According to an embodiment, when there are a plurality of reference pixels having a shortest distance, the image processing apparatus 10 may select one of the reference pixels according to a preset rule and determine a distance between the selected reference pixel and the center pixel as a distance value corresponding to the center pixel. Referring to FIG. 4B, for example, if it is assumed that a distance between an arbitrary pixel and a pixel that is horizontally or vertically adjacent to the arbitrary pixel is 1, a shortest distance (d2 or d3) between the center pixel 400 and a reference pixel (430 or 440) having the shortest distance from the center pixel 400 may be 1. Meanwhile, according to an embodiment, the image processing apparatus 10 may calculate a distance between a center pixel and a reference pixel in decimal as well as integral forms and thus, the shortest distance may be a value including a decimal value.

Figure 5A:
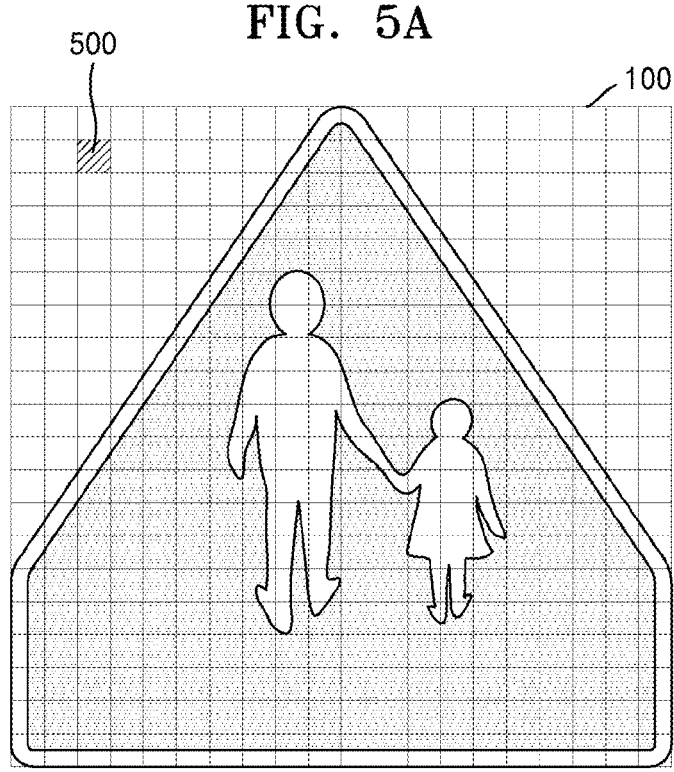
FIGS. 5A and 5B are diagrams illustrating an example input image and an example distance field image generated from the input image, according to an example embodiment.
Figure 5B:
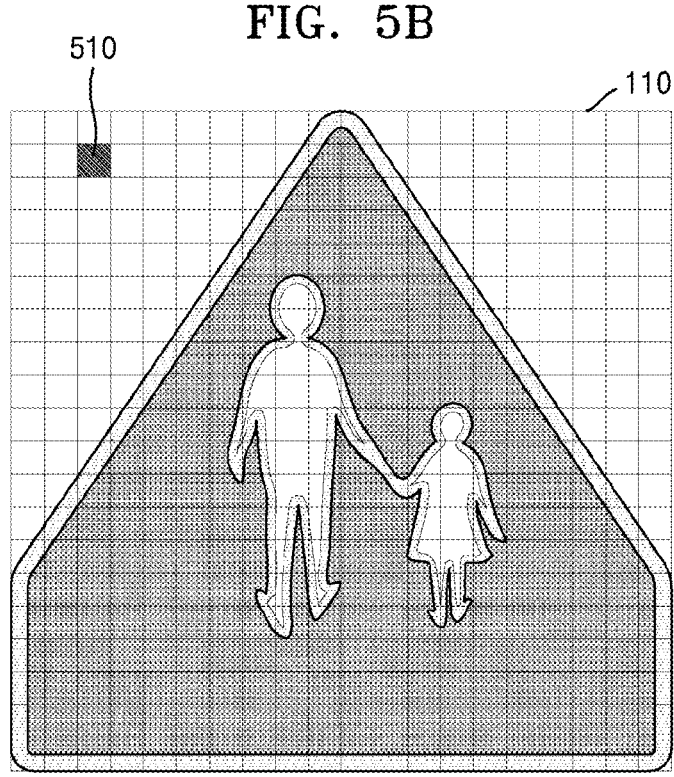

FIGS. 5A and 5B diagrams illustrating an example input image and an example distance field image generated from the input image, according to an example embodiment.

FIG. 5A illustrates an input image 100, and FIG. 5B illustrates the distance field image 110 generated according to the embodiment of FIGS. 3 and 4. A value represented by an arbitrary pixel 510 in the distance field image 110 of FIG. 5B may refer to the shortest distance between a pixel 500 of FIG. 5A corresponding to the pixel 510 of FIG. 5B and a reference pixel indicating an edge. Descriptions thereof were provided with reference to FIGS. 3 and 4.

Figure 6A:
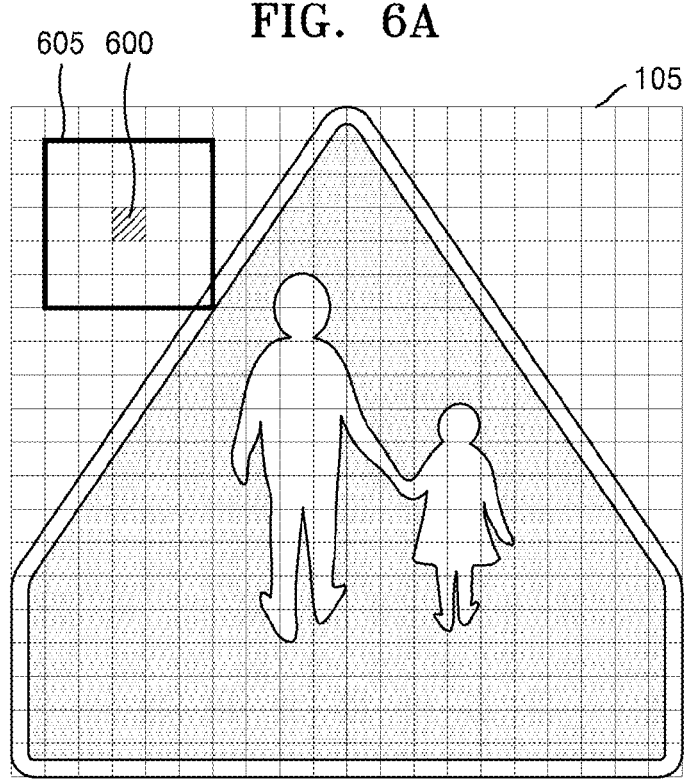
FIGS. 6A and 6B are diagrams illustrating an example of generating a final enlarged input image using an enlarged grayscale input image and an enlarged distance field image, according to an example embodiment.
Figure 6B:
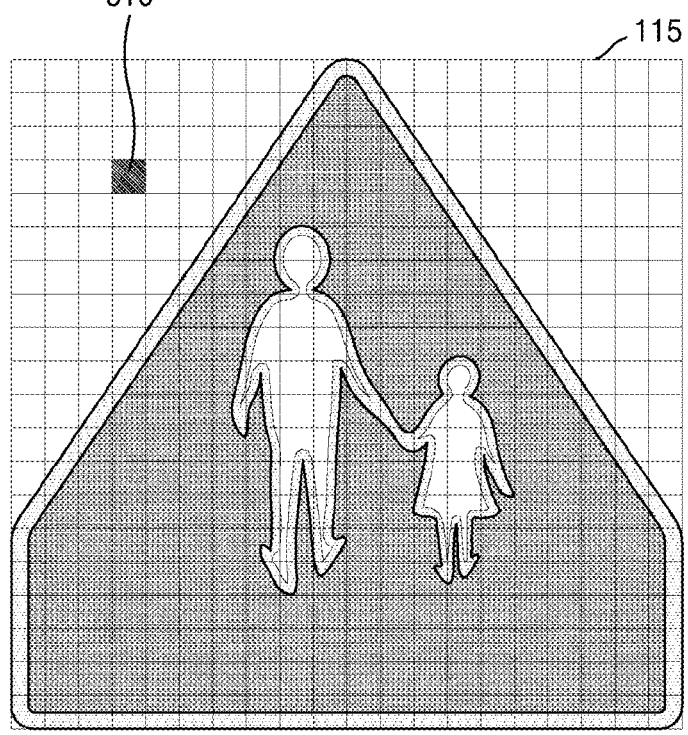

FIGS. 6A and 6B are diagrams illustrating an example of generating a final enlarged input image using an enlarged grayscale input image and an enlarged distance field image according to an example embodiment.

According to an embodiment, the image processing apparatus 10 may generate an enlarged input image using an input image and a distance field image.

Also, according to an embodiment, when enlarging an input image, a distance field image generated using a predetermined scaling factor may be enlarged, an input image obtained using a predetermined scaling factor may be enlarged, a weight to be applied to a location of each pixel may be determined by applying a predetermined smoothing function to each pixel of the enlarged distance field image, and a pixel value for each pixel may be determined using the weight determined for each pixel of the enlarged input image.

FIG. 6A illustrates the enlarged input image 105 obtained by applying a predetermined scaling factor to the input image 100, and FIG. 6B illustrates an enlarged distance field image 115 obtained using the scaling factor having the same size as when the input image 100 is enlarged, to the distance field image 110. A scaling factor may refer, for example, to a rational number greater than 0.

Referring to FIGS. 6A and 6B, it is assumed that the enlarged input image 105 of FIG. 6A is a twice-enlarged image of the input image 100 of FIG. 5A, and the enlarged distance field image 115 of FIG. 6B is a twice-enlarged image of the distance field image 110 of FIG. 5B. Thus, here, a scaling factor may be 2.

In order to calculate a final pixel value for an arbitrary pixel 600 of FIG. 6A, the image processing apparatus 10 may determine a weight to be applied to the pixel 600 of FIG. 6A by applying a predetermined smoothing function to a pixel 610 of FIG. 6B corresponding to the pixel 600 of FIG. 6A. Also, the image processing apparatus 10 may determine a final pixel value for the pixel 600 using pixels in a mask having the pixel 600 of FIG. 6A as a center pixel and having a predetermined size and the weight obtained with reference to FIG. 6A. According to an embodiment, a size of the mask may be the same as that of the mask used when generating a distance field image with respect to an input image in FIG. 4.

Figure 7A:
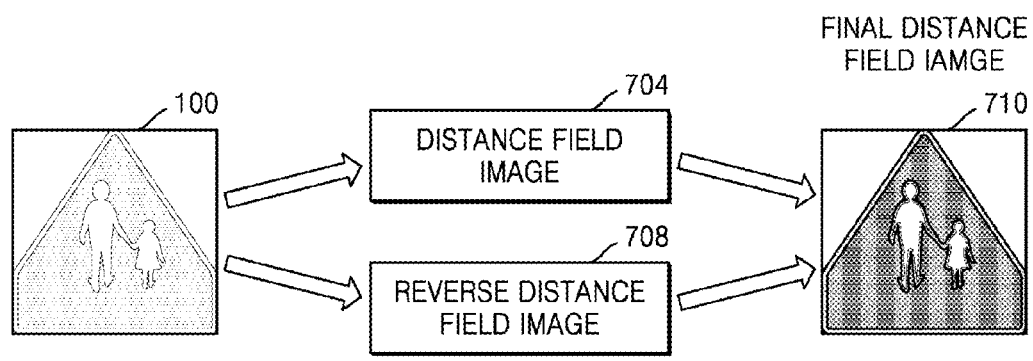
FIGS. 7A, 7B, and 7C are diagrams illustrating an example of obtaining a reverse distance field image when generating a final distance field image using a distance field image and the reverse distance field image according to an example embodiment.
Figure 7B:
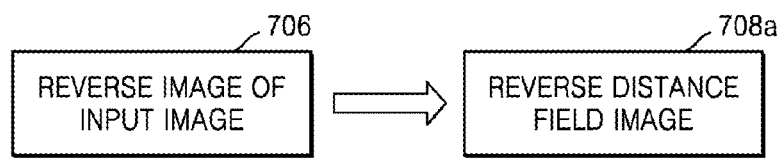
Figure 7C:
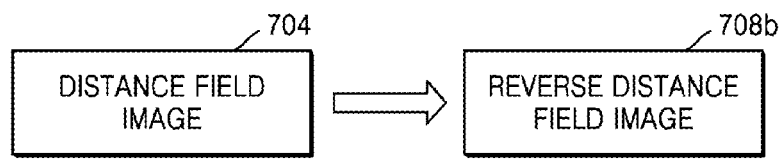

FIGS. 7A, 7B, and 7C are diagrams illustrating an example of obtaining a reverse distance field image when generating a final distance field image using a distance field image and the reverse distance field image according to an example embodiment.

The image processing apparatus 10 according to an embodiment, when generating a distance field image, may generate a reverse image of an obtained input image, obtain a distance value corresponding to each pixel of the generated reverse image to generate a reverse distance field image including distance values, generate a final distance field image using the distance field image and the reverse distance field image, and when enlarging an input image, enlarge the input image using the final distance field image. According to an embodiment, a reverse image of an input image may have an effect in which a dark area is converted into a light area and a light area is converted into a dark area and may be generated by subtracting a pixel value of each pixel from the maximum brightness value of an image. For example, a pixel value of a reverse image may be a value obtained by subtracting a pixel value of a pixel of an input image, corresponding to a pixel of the reverse image, from 255 (e.g., the maximum brightness value of 8 bit image).

Also, the image processing apparatus 10 according to an embodiment may, when generating a distance field image, perform a prediction using distance values of the distance field image to generate a reverse distance field image, generate a final distance field image using the distance field image and the reverse distance image, and when enlarging an input image, enlarge the input image using the final distance field image.

According to an embodiment, the image processing apparatus 10 may generate a final distance field image 710 using two distance field images. Referring to FIG. 7A, the image processing apparatus 10 may generate a distance field image 704 and a reverse distance field image 708 using the input image 100. According to an embodiment, the distance field image 704 of FIG. 7A may be the same as the distance field image 110 of FIG. 5. Also, according to an embodiment, the reverse distance field image 708 of FIG. 7A may include a reverse distance field image 708a of FIG. 7B and a reverse distance field image 708b of FIG. 7C.

Referring to FIG. 7B, the image processing apparatus 10 may generate a reverse image 706 that is a reversed image of the input image 100 and generate the reverse distance field image 708a from the reverse image 706 by performing a method described with reference to FIGS. 3 and 4. For example, the image processing apparatus 10 may calculate a distance value corresponding to each pixel of the reverse image 706 thereby generating the reverse distance field image 708*a* including distance values.

Referring to FIG. 7C, the image processing apparatus 10 may perform a prediction using distance values of the distance field image 704 thereby generating a reverse distance field image 708*b*. For example, the image processing apparatus 10 may apply a predetermined weight to each of pixel values of the distance field image 704 *s* to generate the reverse distance field image 708*b*. According to an embodiment, a predetermined weight may be a constant value or a value related to a pixel value.

Referring to FIG. 7A again, the image processing apparatus 10 may generate a final distance field image 710 using the distance field image 704 and the reverse distance field image 708. Also, the image processing apparatus 10 may enlarge the input image 100 using the final distance field image 710.

According to an embodiment the image processing apparatus 10 may generate the final distance field image 710 by linearly combining the distance field image 704, the reverse distance field image 708, and an arbitrary constant value. For example, each pixel value of the final distance field image 710 may be represented by 128+(a pixel value corresponding to the distance field image 704–a pixel value corresponding to the reverse distance field image 708).

Figure 8:
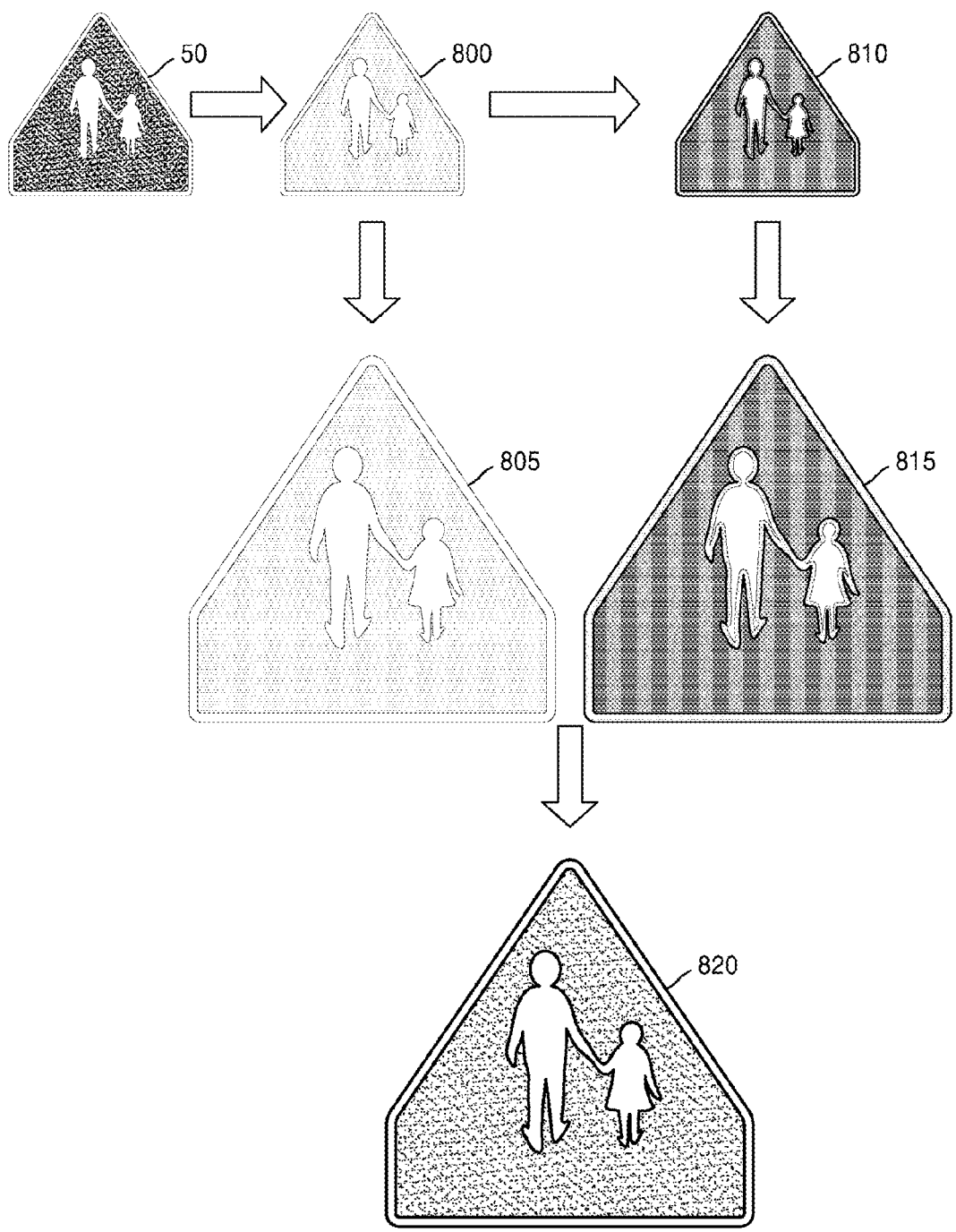
FIG. 8 is a diagram illustrating an example of enlarging a color input image using the color input image and a distance field image generated from the color input image, according to an example embodiment.

FIG. 8 is a diagram illustrating an example of enlarging a color input image using the color input image and a distance field image generated from the color input image, according to an example embodiment.

Referring to FIG. 8, the image processing apparatus 10 may obtain and convert a color input image 50 into a grayscale input image 800. According to an embodiment, the image processing apparatus 10 may select only a Y component from among pixel components of the obtained color image and then obtain a grayscale image corresponding to the color image. However, embodiments are not limited thereto.

Also, according to an embodiment, the image processing apparatus 10 may generate a distance field image 810 using the grayscale input image 800, enlarge the grayscale input image 800 to a predetermined size to obtain a enlarged grayscale input image 805, and enlarge the distance field image 810 to a predetermined size to obtain an enlarged distance field image 815. A process of obtaining of the enlarged grayscale input image 805 and the enlarged distance field image 815 in FIG. 8 may be the same as the process of obtaining the enlarged input image 105 and the enlarged distance field image 115 described in FIGS. 5, 6A and 6B.

Also, according to an embodiment, the image processing apparatus 10 may obtain a final enlarged color image 820 using the enlarged grayscale input image 805 and the enlarged distance field image 815.

According to an embodiment, the image processing apparatus 10 may use the method described with reference to FIGS. 6A and 6B to obtain the final enlarged color image 820, and a weight described with reference to FIGS. 6A and 6B may be applied to each of R, G, and B components of a pixel so that a final pixel value of the R, G, and B components is obtained.

Figure 9:
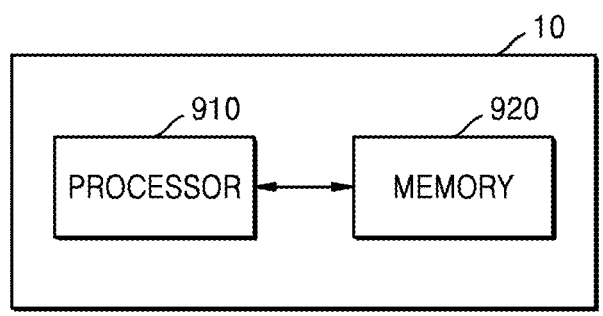
FIG. 9 is a block diagram illustrating an example configuration of an image processing apparatus according to an example embodiment.

FIG. 9 is a block diagram illustrating an example configuration of an image processing apparatus according to an example embodiment.

Referring to FIG. 9, an image processing apparatus 10 according to an embodiment may include a processor (e.g., including processing circuitry) 910 and a memory 920. The image processing apparatus 10 may be embodied as including more components than those illustrated.

Referring to FIG. 9, the image processing apparatus 10 according to an embodiment may, for example, and without limitation, be a television (TV), but this is only an example embodiment. The image processing apparatus 10 may be embodied as an electronic device including a display. For example, the image processing apparatus 10 may be embodied as various electronic devices such as a mobile phone, a tablet PC, a digital camera, a camcorder, a laptop computer, a desktop computer, an e-book reader, a digital broadcasting terminal, a personal digital assistants (PDA), a portable multimedia player (PMP), a navigation device, a MP3 player, a wearable device, or the like, but is not limited thereto. Particularly, embodiments may be easily embodied for a display device having a relatively large-sized display like a TV, but embodiments are not limited thereto. Also, the image processing apparatus 10 may be a fixed-type or a mobile type, and may be a digital broadcasting receiver capable of receiving digital broadcasting.

The processor 910 may include various processing circuitry and controls an overall operation of the image processing apparatus 10 and a signal flow between inner components of the image processing apparatus 10, and performs a function of processing data. When there is an input from a user or a preset stored condition is satisfied, the processor 910 may execute an operation system (OS) and various application stored in the memory 920.

The processor 910 according to an embodiment may perform one or more instructions stored in one or more memories 920 to obtain a distance value corresponding to each pixel of an input image, and thus, generate a distance field image including distance values so that the processor 910 may enlarge the input image using the generated distance field image. For example, the processor 910 according to an embodiment, when generating a distance field image, may determine each pixel of an input image as a center pixel, determine pixels at a constant distance away from the center pixel as reference pixels, calculate the shortest distance from among distances between the center pixel and reference pixels indicating an edge among the reference pixels, and determine the calculated shorted distance as a distance value corresponding to each pixel.

Also, the processor 910 according to an embodiment, when generating a distance field image, may generate a reverse image of an obtained input image, calculate a distance value corresponding to each pixel of the generated reverse image to generate a reverse distance field image including distance values, generate a final distance field image using the distance field image and the reverse distance field image, and when enlarging an input image, enlarge the input image using the final distance field image.

Also, the processor 910 according to an embodiment may enlarge an input image by using a generated distance field image and an obtained input image.

Also, the processor 910 according to an embodiment, when enlarging an input image, may enlarge a generated distance field image using a predetermined scaling factor, enlarge an obtained input image using a predetermined scaling factor, determine a weight to be applied to a location of each pixel by applying a predetermined smoothing function to each pixel of the enlarged distance field image, and determine a pixel value for each pixel by applying the determined weight to each pixel of the enlarged input image.

Also, the processor 910 according to an embodiment, when generating a distance field image, may perform a prediction using distance values of a distance field image to generate a reverse distance field image, generate a final distance field image using the distance field image and the reverse distance image, and when enlarging an input image, enlarge the input image using the final distance field image.

The memory 920 may drive the image processing apparatus 10 by a control of the processor 910 and store various data, programs or applications for controlling. The memory 920 may store a control program for controlling the image processing apparatus 10 and the processor 910, an application initially provided by a producer or downloaded from outside, a graphical user interface (GUI) related to an application, an object (e.g. image test, icon, button, etc.) for providing a GUI, user information, a document, databases or related data.

In an embodiment, a term "memory" may include a ROM, a RAM, a memory card (e.g., micro SD card, USB memory, not shown) mounted in or the image processing apparatus 10, or the image processing apparatus 10. Also, the memory 920 may be a nonvolatile memory, a volatile memory, a hard disk drive (HDD) or a solid state drive SSD.

The memory 920 according to an embodiment may store one or more instructions.

Figure 10A:
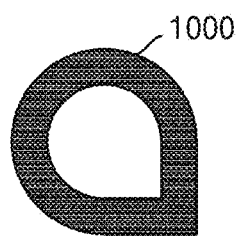
FIGS. 10A, 10B, and 10C are diagrams illustrating an example of enlarging an image using a distance field image generated by an image processing method according to an example embodiment compared with an image enlarged by conventional technology.
Figure 10B:
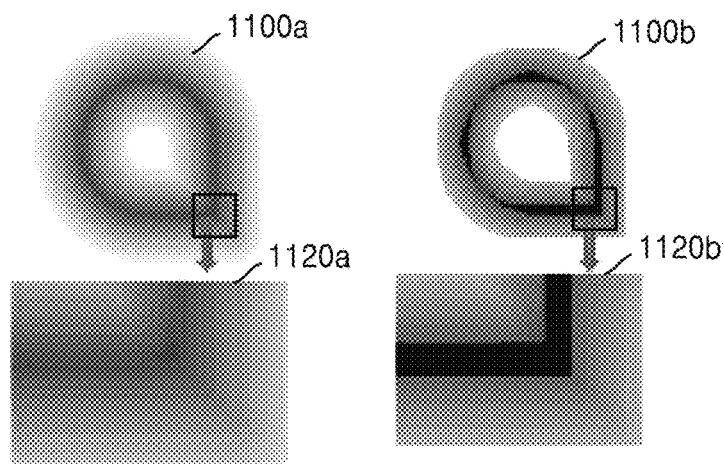
Figure 10C:
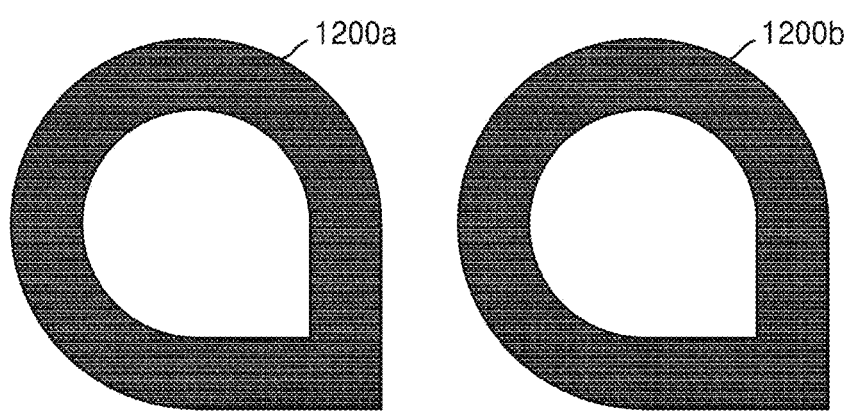

FIGS. 10A, 10B, and 10C are diagrams illustrating an example of using a distance field image generated by an image processing method according to an embodiment compared with an image enlarged by a conventional technology.

Referring to FIGS. 10A, 10B, and 10C, the image processing apparatus 10 may obtain a distance field image 1100b with respect to an input image 1000 of FIG. 10A using a method according to an embodiment, and obtain an enlarged input image 1200b using the input image 1000 and the distance field image 1100b. Also, according to a conventional method, a distance field image 1100a may be obtained with respect to the input image 1000, and an enlarged input image 1200a may be obtained by using the distance field image 1100a.

As illustrated in FIG. 10B, when comparing some areas 1120a of the distance field image 1100a obtained by a conventional method with some areas 1120b of the distance field image 1100b obtained by a method according to an embodiment, in view of a distance field image that indicates a distance between each pixel of an image and an edge or a boundary of the pixel, the method according to an embodiment does not present a more precise distance value than the conventional method. That is, in 1120a, a distance between each pixel and a boundary is clearly presented, but in 1120b, distances between pixels included in a particular region and a boundary are presented to be the same. However, unlike the conventional method that needs iterations, the method according to an embodiment performs a calculation based on a mask and thus, is capable of real-time processing and has no limit in terms of a calculation range. Also, when enlarging an image by using a distance field image, the image processing apparatus 10 generally uses only information related to areas nearby an edge or a boundary of the image, and in terms of information nearby an edge or a boundary of the input image 1000, it is found that the distance field image 1100b obtained by the method according to an embodiment shows substantially the same result as the distance field image 1100a obtained by the conventional method. Thus, referring to FIG. 10C, the enlarged input image 1200b according to the method according to an embodiment may have substantially the same result as the enlarged input image 1200a according to the conventional method.

The embodiments can be written as computer programs and can be implemented in general-use digital computers that execute the programs using a computer readable recording medium. Furthermore, the data structure used in the embodiments described above may be recorded in a non-transitory computer readable recording medium in various ways. The embodiments described above of the present disclosure may be embodied as a recording medium, e.g., a program module to be executed in computers, which include computer-readable commands. For example, when software modules or algorithms are involved, these software modules may be stored as program instructions or computer readable codes executable on a processor on a computer-readable medium.

The non-transitory computer-readable medium may include an arbitrary available medium accessible by a computer, and examples thereof include all volatile and non-volatile media and separable and non-separable media. Examples of the non-transitory computer readable recording medium include magnetic storage media (e.g., ROM, floppy disks, hard disks, etc.), and optical recording media (e.g., CD-ROMs, or DVDs), but the present disclosure is not limited thereto. Further, examples of the computer-readable recording medium may include a computer storage medium and a communication medium.

Also, the computer readable recording medium may also be distributed over a network coupled to computer systems, and data stored in the distributed recording medium, e.g., a program command and a code, may be executed by at least one computer.

The particular implementations illustrated and described herein are illustrative examples of the present disclosure and are not intended to otherwise limit the scope of the present disclosure in any way. For the sake of brevity, conventional electronics, control systems, software development and other functional aspects of the systems may not be described in detail.

While the present disclosure has been illustrated and described with reference to various example embodiments thereof, it will be understood by one of ordinary skill in the art that various changes in form and details may be made therein without departing from the spirit and scope of the present disclosure as defined by the following claims. Hence, it will be understood that the embodiments described above are not limiting of the scope of the disclosure. For example, each component described in a single type may be executed in a distributed manner, and components described distributed may also be executed in an integrated form.

The use of any and all examples, or example language (e.g., "such as") provided herein, is intended merely to better illuminate the present disclosure and does not pose a limitation on the scope of the present disclosure unless otherwise claimed.

Moreover, no item or component is essential to the practice of the present disclosure unless the element is specifically described as "essential" or "critical".

It will be understood by one of ordinary skill in the art that various changes in form and details may be made therein without departing from the spirit and scope of the present disclosure as defined by the appended claims.

As the present disclosure allows for various changes and numerous embodiments, this is not intended to limit the present disclosure to particular modes of practice, and it is to be appreciated that all changes, equivalents, and substitutes that do not depart from the spirit and technical scope are encompassed in the present disclosure. The preferred embodiments should be considered in descriptive sense only and not for purposes of limitation.

The scope of the present disclosure is indicated by the claims rather than by the detailed description, and it should be understood that the claims and all modifications or modified forms drawn from the concept of the claims are included in the scope of the present disclosure.

The terms, such as 'unit' '- or/er' or 'module', should be understood as a unit that processes at least one function or operation and that may be embodied by hardware, software, or a combination thereof.

The "unit" or "module" may be stored in an addressable storage medium or may be implemented by a program that may be executed by a processor.

For example, the "unit" or "module" may be implemented by elements such as software elements, object-oriented software elements, class elements, and task elements, processes, functions, attributes, procedures, subroutines, segments of program code, drivers, firmware, micro codes, circuits, data, a database, data structures, tables, arrays, and variables.

It should be understood that embodiments described herein should be considered in a descriptive sense only and not for purposes of limitation. Descriptions of features or aspects within each embodiment should typically be considered as available for other similar features or aspects in other embodiments.

While various example embodiments have been described with reference to the figures, it will be understood by one of ordinary skill in the art that various changes in form and details may be made therein without departing from the spirit and scope as defined by the following claims.

What is claimed is:

1. An image processing method comprising:
obtaining an input image;
generating a distance field image including distance values by calculating the distance values respectively corresponding to pixels of the obtained input image; and
enlarging the input image using the generated distance field image,
wherein the generating of the distance field image comprises, with respect to each pixel of a plurality of pixels of the input image,
determining each pixel of the plurality of pixels of the input image as a center pixel;
generating a mask having a predetermined size which is smaller than size of the input image with the center pixel at a center thereof;
determining pixels in the mask other than the center pixel as reference pixels;
determining reference pixels indicating an edge among the reference pixels based on a difference between a pixel value of the center pixel and a pixel value of each of the reference pixels;
calculating a shortest distance from among distances between the center pixel and the reference pixels indicating the edge; and
determining the calculated shortest distance as a distance value corresponding to each pixel.

2. The method of claim 1, wherein the generating of the distance field image comprises
generating a reverse image of the obtained input image;
generating a reverse distance field image including distance values by calculating the distance values respectively corresponding to pixels of the generated reverse image; and
generating a final distance field image using the distance field image and the reverse distance field image, and
wherein the enlarging of the input image comprises, enlarging the input image using the final distance field image.

3. The method of claim 1, further comprising
enlarging the input image using the generated distance field image and the obtained input image.

4. The method of claim 3, wherein the enlarging of the input image comprises:
enlarging the generated distance field image using a predetermined scaling factor;
enlarging the obtained input image using the predetermined scaling factor;
determining a weight to be applied to a location of each pixel of the enlarged distance field image by applying a predetermined smoothing function to each pixel; and
determining a pixel value for each pixel of the enlarged input image by applying the determined weight to each pixel.

5. The method of claim 1, wherein the generating of the distance field image comprises:
generating a reverse distance field image by using the distance values of the distance field image; and
generating a final distance field image using the distance field image and the reverse distance image, and
wherein the enlarging of the input image comprises enlarging the input image using the final distance field image.

6. The method of claim 1, wherein the predetermined size of the mask is M×N pixels, M and N being integers greater than 0.

7. An image processing apparatus comprising:
a memory configured to store one or more instructions; and
a processor configured to execute the one or more instructions to process an image,
wherein the processor is configured to: generate a distance field image including distance values by calculating the distance values respectively corresponding to pixels of the image and enlarge the input image using the generated distance field image, and
wherein in generating the distance field image, the processor is configured, with respect to each pixel of a plurality of pixels of the image, to execute the one or more instructions to:
determine each pixel of the plurality of pixels of the input image as a center pixel;
generate a mask having a predetermined size which is smaller than size of the input image with the center pixel at a center thereof;
determine pixels in the mask other than the center pixel as reference pixels;
determining reference pixels indicating an edge among the reference pixels based on a difference between a pixel value of the center pixel and a pixel value of each of the reference pixels;
calculate a shortest distance from among distances between the center pixel and the reference pixels indicating the edge; and
determine the calculated shortest distance as a distance value corresponding to each pixel.

8. The apparatus of claim 7, wherein when, generating the distance field image comprises,
generating a reverse image of the image;
generating a reverse distance field image including distance values by calculating the distance values respectively corresponding to pixels of the generated reverse image; and generating a final distance field image using the distance field image and the reverse distance field image, and
wherein the enlarging of the image comprises,
enlarging the input image using the final distance field image.

9. The apparatus of claim 7, wherein the image is enlarged using the generated distance field image and the input image.

10. The apparatus of claim 7, wherein, when the image is enlarged,
the generated distance field image is enlarged using a predetermined scaling factor, the image is enlarged using the predetermined scaling factor, a weight to be applied to a location of each pixel of the enlarged distance field image is determined by applying a predetermined smoothing function to each pixel, and a pixel value for each pixel of the enlarged input image is determined by applying the determined weight to the each pixel.

11. The apparatus of claim 7, wherein, when the distance field image is generated,
a reverse distance field image is generated by using distance values of the distance field image, and a final distance field image is generated using the distance field image and the reverse distance image, and
when the input image is enlarged,
the input image is enlarged using the final distance field image.

12. The apparatus of claim 7, wherein the predetermined size of the mask is M×N pixels, M and N being integers greater than 0.

13. A computer program product comprising a non-transitory computer readable storage medium having a computer readable program stored therein,
wherein the computer readable program, when executed on a computing device, causes the computing device to:
generate a distance field image including distance values by calculating the distance values respectively corresponding to pixels of the image and enlarge the input image using the generated distance field image, and
wherein the generating of the distance field image comprises,
with respect to each of a plurality of pixels of the input image,
determining each of the plurality of pixels of the input image as a center pixel;
generating a mask having a predetermined size which is smaller than size of the input image with the center pixel at a center thereof;
determining pixels in the mask other than the center pixel as reference pixels;
determining reference pixels indicating an edge among the reference pixels based on a difference between a pixel value of the center pixel and a pixel value of each of the reference pixels;
calculating a shortest distance from among distances between the center pixel and the reference pixels indicating the edge; and
determining the calculated shortest distance as a distance value corresponding to each pixel.

* * * * *